(12) United States Patent
Yoshizawa

(10) Patent No.: US 8,290,620 B2
(45) Date of Patent: Oct. 16, 2012

(54) ROUTE CREATION METHOD AND ROUTE CREATION DEVICE

(75) Inventor: Shintaro Yoshizawa, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 637 days.

(21) Appl. No.: 12/572,820

(22) Filed: Oct. 2, 2009

(65) Prior Publication Data

US 2010/0023164 A1 Jan. 28, 2010

Related U.S. Application Data

(63) Continuation of application No. PCT/JP2008/057793, filed on Apr. 16, 2008.

(30) Foreign Application Priority Data

Apr. 16, 2007 (JP) ................. 2007-107368

(51) Int. Cl.
*G05B 19/19* (2006.01)
(52) U.S. Cl. ......................... 700/252; 700/33
(58) Field of Classification Search ................. 700/252, 700/33, 61, 62, 56, 213, 245, 250, 255; 901/2, 901/14, 50; 318/568.15, 573, 568.16, 568.21
See application file for complete search history.

(56) References Cited

U.S. PATENT DOCUMENTS

| | | | |
|---|---|---|---|
| 6,249,718 B1 * | 6/2001 | Gilliland et al. | ............. 700/255 |
| 7,024,276 B2 | 4/2006 | Ito | |
| 7,110,859 B2 * | 9/2006 | Shibata et al. | ............... 700/245 |
| 7,130,718 B2 * | 10/2006 | Gunnarsson et al. | ......... 700/254 |
| 7,298,385 B2 * | 11/2007 | Kazi et al. | ..................... 345/633 |
| 7,457,698 B2 * | 11/2008 | Danko | ............................ 701/50 |

FOREIGN PATENT DOCUMENTS

| | | |
|---|---|---|
| JP | A-1-289684 | 11/1989 |
| JP | A-1-315802 | 12/1989 |
| JP | A-5-250023 | 9/1993 |
| JP | A-7-141016 | 6/1995 |
| JP | A-7-225612 | 8/1995 |
| JP | A-7-253809 | 10/1995 |
| JP | A-8-118202 | 5/1996 |
| JP | A-10-249761 | 9/1998 |
| JP | A-2002-301674 | 10/2002 |
| JP | A-2003-103481 | 4/2003 |
| JP | A-2005-309990 | 11/2005 |
| JP | A-2006-48372 | 2/2006 |
| JP | A-2006-155559 | 6/2006 |

OTHER PUBLICATIONS

International Preliminary Report on Patentability completed on Apr. 13, 2009 in corresponding International Application No. PCT/JP2008/057793.
Notice of Reasons for Rejection dated Feb. 22, 2011 in corresponding Japanese Patent Application No. 2007-107368 (with translation).

* cited by examiner

*Primary Examiner* — Dalena Tran
(74) *Attorney, Agent, or Firm* — Oliff & Berridge, PLC

(57) ABSTRACT

Disclosed is a route creation method capable of creating a travel route which reduces the travel quantity of a robot and achieves the efficient travel of the robot. The route creation method and route creation device creates a plurality of candidate routes by using an intermediate point generated between the initial position and the final position set in advance, and thereafter evaluates the travel quantity of a traveling part of a robot with respect to each candidate route to select a candidate route, which achieves the most efficient travel, as a travel route.

4 Claims, 16 Drawing Sheets

ROUTE CREATION METHOD AND ROUTE CREATION DEVICE

CROSS-REFERENCE TO RELATED APPLICATIONS

This is a Continuation application PCT/JP2008/057793 filed on Apr. 16, 2008.

TECHNICAL FIELD

The present invention relates to a route creation method and a route creation device which create the travel route of a traveling part to be moved by the operation of joints in a robot having a plurality of joints.

BACKGROUND ART

A route creation method and route creation device is known which probabilistically generate an intermediate point between an initial position and a final position, and creates the travel route of a robot by using the intermediate point (for example, Japanese Unexamined Patent Application Publication No. 2006-048372). In this route creation method and route creation device, a route is created so as to linearly connect the initial position and the final position to the intermediate point, it is determined whether or not a robot has collided against an obstacle when the robot has moved by a unit length in the route on the final position side, and it is determined whether or not the robot has collided against an obstacle when the robot has moved by a unit length in the route on the initial position side. When it is determined that the robot has not collided against an obstacle, a route is decided for the unit length of each of the routes on the final position side and the initial position side. Meanwhile, when it is determined that the robot has collided against an obstacle, an intermediate point is generated again to create a new route. This decision of a route for a unit length is repeatedly performed, and when the route on the initial position side and the route on the final position side are linked with each other, the entire route is used as the travel route of the robot.

DISCLOSURE OF THE INVENTION

In the above-described route creation method and route creation device, the intermediate point is probabilistically generated without taking the efficiency of the travel quantity of the robot into consideration, the route is created while only determining whether or not the robot does not collide against an obstacle, and if one travel route is found, subsequent route creation is not performed. Accordingly, when the robot has traveled along the relevant travel route, the travel quantity may increase, which may make it difficult to achieve efficient travel.

The invention has been finalized in order to solve such problems, and it is an object of the invention to provide a route creation method and a route creation device capable of creating a travel route which reduces the travel quantity of a robot and achieves the efficient travel of the robot.

An aspect of the invention provides a route creation method of creating a travel route of a traveling part to be moved by the operation of joints in a robot having a plurality of joints. The route creation method includes the steps of generating an intermediate point between the initial position and the final position of the travel route and creating a plurality of candidate routes as candidates for the travel route between the initial position and the final position with the intermediate point as a target, and evaluating the travel quantity of the traveling part of the robot with respect to each candidate route to select one travel route.

Another aspect of the invention provides a route creation device for creating a travel route of a traveling part to be moved by the operation of joints in a robot having a plurality of joints. The route creation device includes a candidate route creation unit generating an intermediate point between the initial position and the final position of the travel route and creating a plurality of candidate routes as candidates for the travel route between the initial position and the final position with the intermediate point as a target, and a travel quantity evaluation unit evaluating the travel quantity of the traveling part of the robot with respect to each candidate route to select one travel route.

With the route creation method and route creation device, a plurality of candidate routes can be created by using the generated intermediate point, and thereafter the travel quantity of the traveling part of the robot can be evaluated with respect to each candidate route to select a candidate route, which achieves the most efficient travel, as the travel route. Therefore, a travel route can be created which reduces the travel quantity of the traveling part of the robot and achieves the efficient travel of the robot.

In the route creation method, when a plurality of candidate routes are created, a partial route of a previously created candidate route may be used. In the route creation device, the candidate route creation unit may create a plurality of candidate routes by using a partial route of a previously created candidate route. With this configuration, a route can be newly created while using a previously created candidate route, and thus, a plurality of candidate route can be efficiently created.

In the route creation method, when the travel quantity of the traveling part of the robot is evaluated with respect to each candidate route, a work space where the robot is actually present may be defined, the travel quantity of the traveling part when having traveled along each candidate route may be converted into a travel quantity in the work space, and the converted travel quantity may be evaluated. In the route creation device, the travel quantity evaluation unit may define a work space where the robot is actually present, may convert the travel quantity of the traveling part when having traveled along each candidate route into a travel quantity in the work space, and may evaluate the converted travel quantity. With this configuration, the travel quantity of the traveling part of the robot when having traveled along the created candidate route can be converted into the travel quantity of the traveling part of the robot in the work space, and the converted travel quantity can be evaluated. Therefore, a travel route can be created which achieves the most efficient travel of the robot in the actual space.

According to the invention, a travel route can be created which reduces the travel quantity of the robot and achieves the efficient travel of the robot.

BEST MODE FOR CARRYING OUT THE INVENTION

Figure 1:
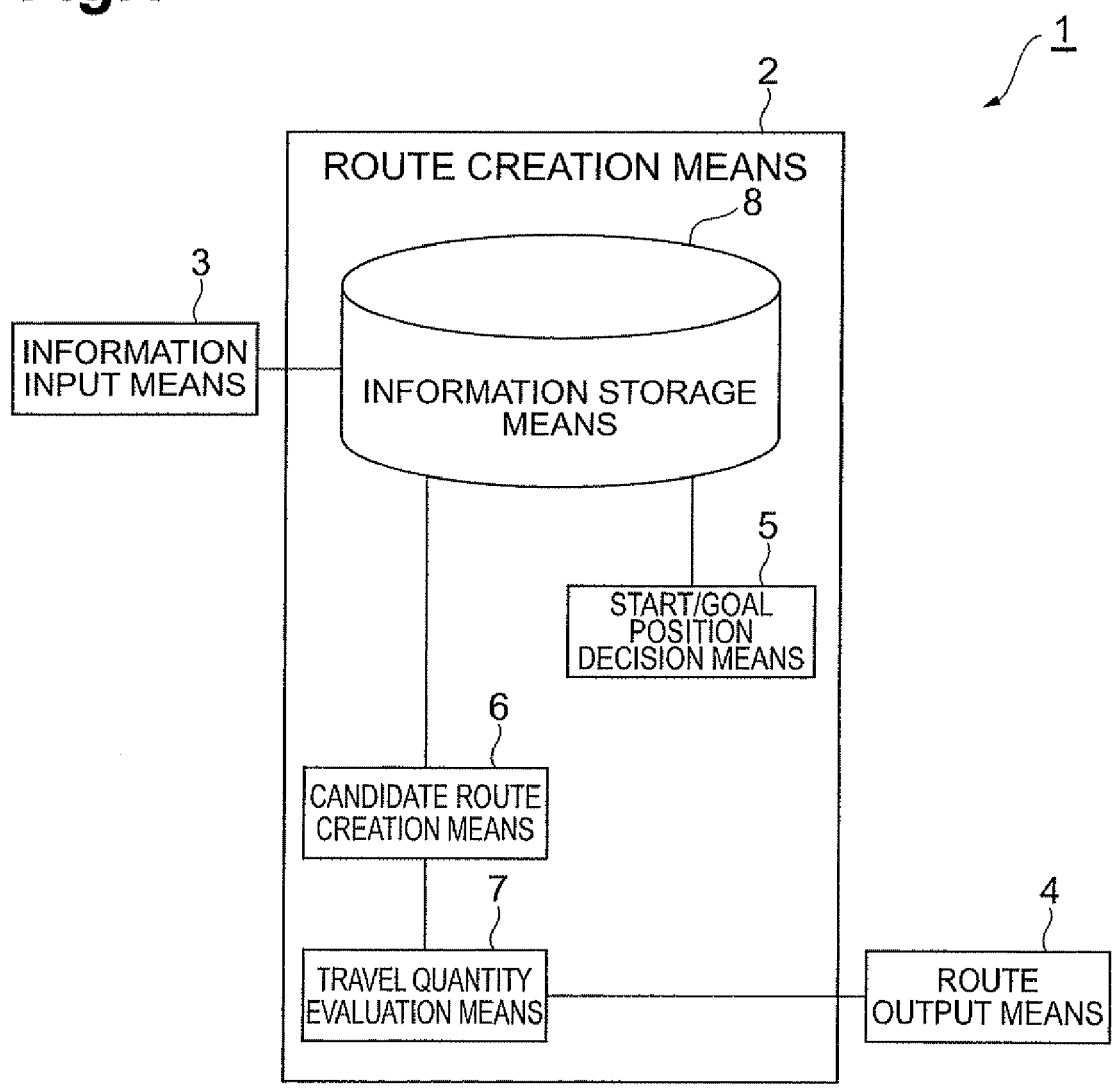
FIG. 1 is a schematic view showing the configuration of a route creation device which executes a route creation method of this embodiment.

Hereinafter, an embodiment of a route creation method and a route creation device of the invention will be described. First, FIG. 1 is a schematic view showing the configuration of a route creation device which executes a route creation method of this embodiment. A route creation device 1 is specifically formed by a computer. As shown in FIG. 1, the route creation device 1 is a device which creates a travel route of a traveling part to be moved by the operation of joints in a robot having a plurality of joints. The route creation device 1 has route creation means (unit) 2 which creates a plurality of candidate routes as candidates for the travel route and selects one candidate route, information input means (unit) 3 which is means for inputting external information, and route output means (unit) 4 which converts a route being created or a travel route finally created (set) into a travel command signal and outputs the travel command signal to the robot.

The route creation means 2 has start/goal position decision means (unit) 5 which finally decides the start position (initial position) and the goal position (final position) of the travel route, candidate route creation means (unit) 6 which sets (temporarily sets) an intermediate point between the start position and the goal position to create a plurality of candidate routes, travel quantity evaluation means (unit) 7 which evaluates the travel quantity of the traveling part of the robot with respect to each created candidate route to select one travel route, and information storage means (unit) 8 which stores input information from the information input means 3. The start/goal position decision means 5, the candidate route creation means 6, and the travel quantity evaluation means 7 are implemented by a program stored in a hard disk or a ROM, and a CPU executing the program. The information storage means 8 is specifically a hard disk, a RAM, or the like.

The information input means 3 is means for inputting joint angle information of the initial posture and the target posture of the robot having a plurality of joints, information regarding obstacles around the robot, and a set value about the number of candidate routes as candidates for the travel route. The information input means 3 is formed by an information acquisition device, such as a camera, various kinds of sensors, or the like, a keyboard, or an optical disk drive in which data is stored in advance. The route output means 4 is specifically a driver or the like which operates the actuator of the robot.

Figure 2:
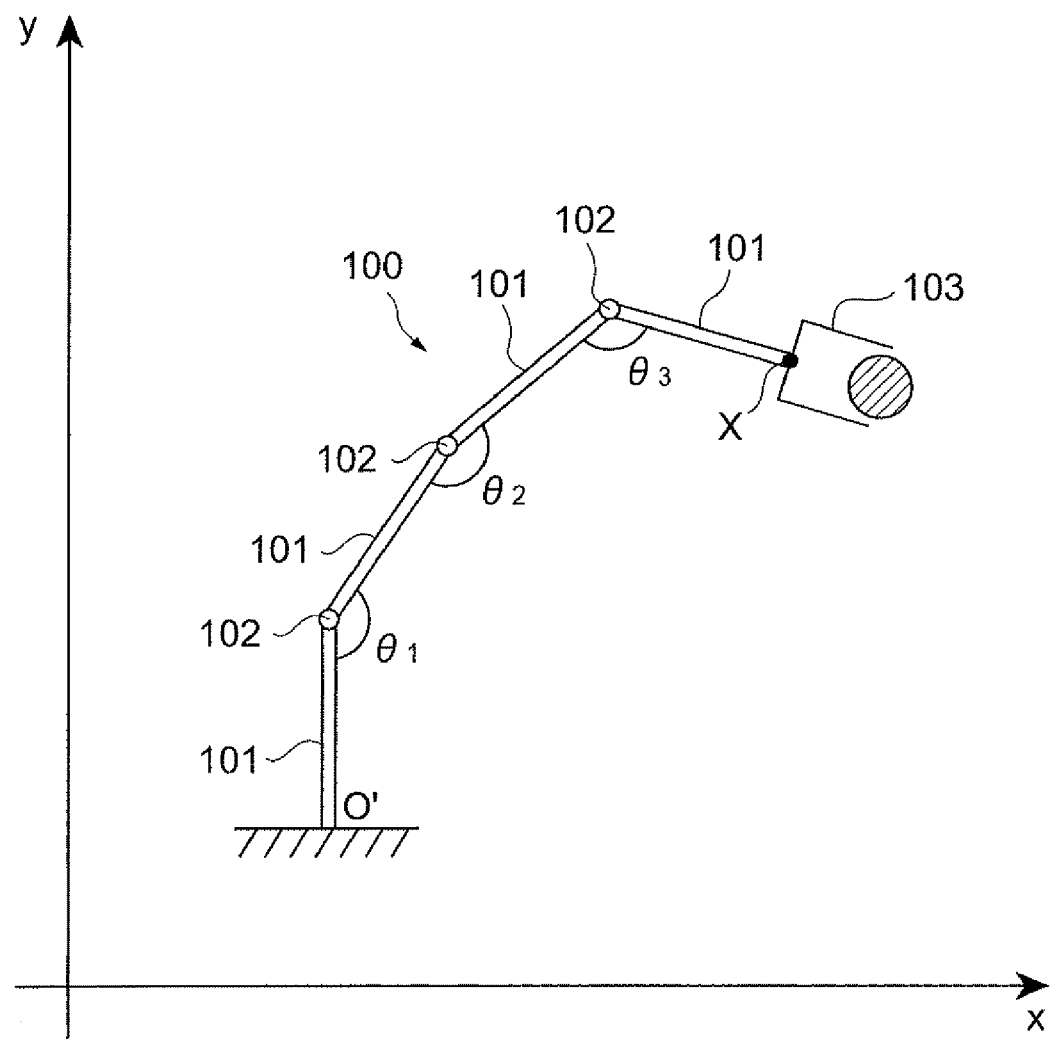
FIG. 2 is a diagram schematically showing a robot arm which is traveling along a travel route created by a route creation device.

In this embodiment, an example where a robot having a plurality of joints is a robot arm will be described. FIG. 2 is a diagram schematically showing a robot arm 100 which travels along a travel route created by the route creation device 1. As shown in FIG. 2, the robot arm 100 includes a plurality of links 101 and articular joints 102 each disposed between two links 101. Each articular joint 102 is a joint with a single degree of freedom. A grip 103 is attached at the front end of the robot arm 100. Here, it is assumed that the route creation device 1 creates the travel route for the base of the grip 103, that is, the front end portion (wrist position X) of the terminal link 101. A space where the robot arm 100 is actually present is called a work space.

If the angle of each articular joint 102 is known, the state of the robot arm 100, that is, the posture of the robot arm 100 can be grasped. Here, if a multidimensional coordinate space (in this example, a three-dimensional coordinate space) is set with the angles $\theta_1$, $\theta_2$, and $\theta_3$ at three articular joints 102 in FIG. 2 as the coordinate axes, the posture of the robot arm 100 can be expressed by one point [coordinate $(\theta_1,\theta_2,\theta_3)$] in the multidimensional coordinate space.

When the x and y coordinate axes are set with respect to the work space, the coordinate (x,y) of the wrist position X representing the posture of the robot arm 100 can be easily obtained by converting the coordinate $(\theta_1,\theta_2,\theta_3)$ on the multidimensional coordinate space. In this example, although the state (posture) of the robot arm 100 is expressed by the three-dimensional coordinate, the state (posture) of the robot arm 100 may be expressed in a two-dimensional coordinate space or a multidimensional coordinate space. For example, in the case of a robot arm having seven articular joints 102, the state (posture) of the robot arm may be expressed as one point in a seven-dimensional coordinate space. In the case of a robot arm having three articular joints and one extendable portion, the state (posture) of the robot arm may be expressed as one point in a four-dimensional coordinate space.

Next, a process of the route creation device 1 which executes the route creation method of this embodiment will be described.

Figure 3:
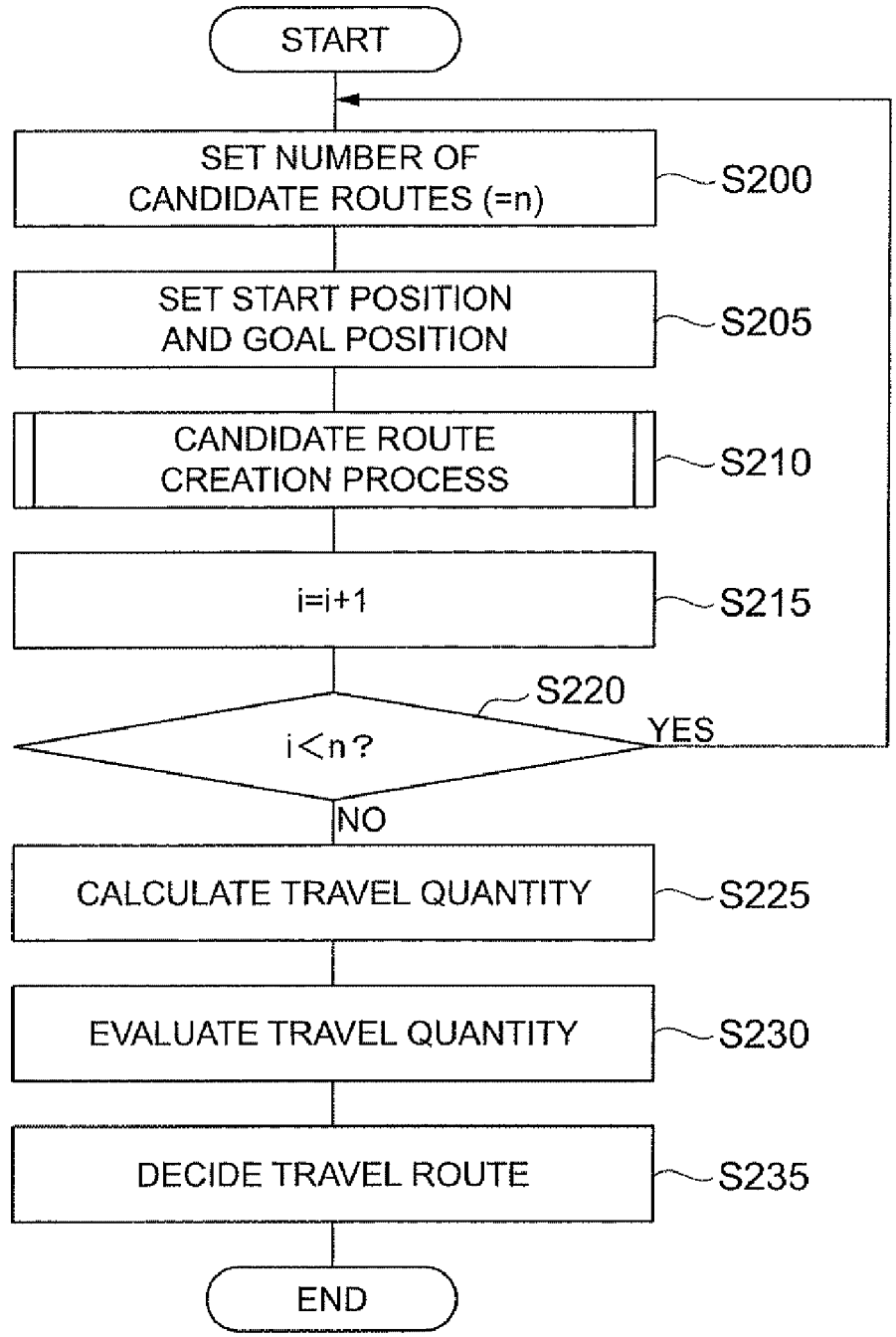
FIG. 3 is a flowchart illustrating a route creation process of the route creation method according to this embodiment.
Figure 4:
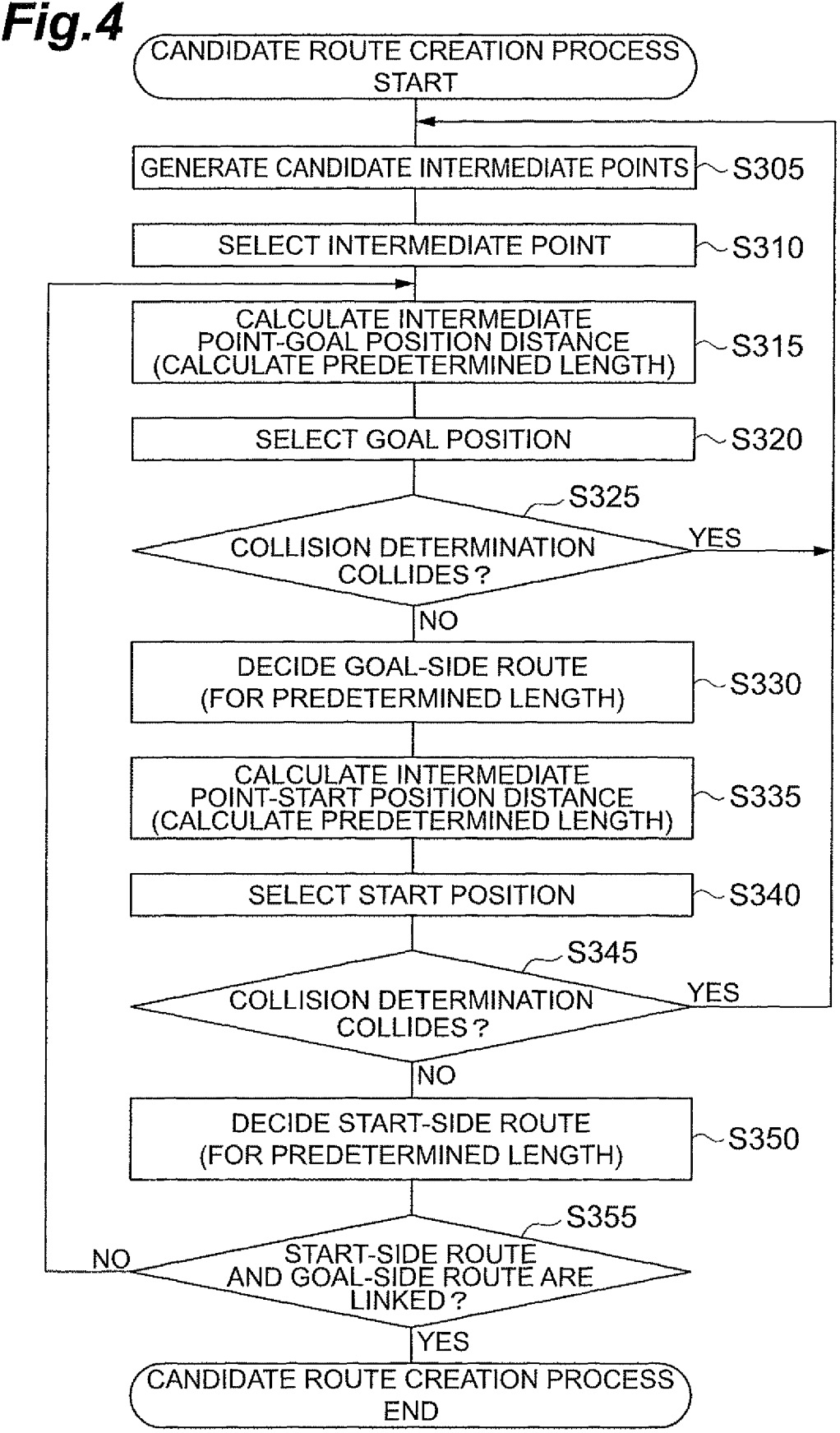
FIG. 4 is a flowchart illustrating a candidate route creation process during the route creation process of FIG. 3.

FIG. 3 is a flowchart illustrating a route creation process of the route creation method according to this embodiment. FIG. 4 is a flowchart illustrating a candidate route creation process in the route creation process of FIG. 3. The route creation process is executed when the robot operates.

As shown in FIG. 3, with regard to travel route creation, first, information regarding the number n of candidate routes and the like is input by the information input means 3. When sufficient information is input and stored in the information storage means 8, new external environment information may not need to be input. In this embodiment, the number n of candidate routes is set to 4 (S200).

Next, an operator sets the start position and the goal position of the travel route on the work space. If these positions are preset in advance, the operator does not need to input the positions. The operator may operate a keyboard to input the coordinate positions so as to set the start and goal positions. Alternatively, the robot arm 100 may be connected to the information input means 3 to read the coordinates when the robot arm 100 is actually positioned at the start and goal positions. Further, external environment information may be automatically or semi-automatically acquired by a camera or various kinds of sensors provided in the device.

In this case, a plurality of goal positions may be set. Although the description has been made for the robot arm 100, the number of postures (wrist position X) of the robot arm 100 there are when gripping an object at the final position is taken into consideration. The robot may grip the object from the above or grasp the object from the right/left side. A plurality of goal positions are set in advance taking such variation into consideration. With regard to an automatic machine other than the robot arm, there are many cases where the manner of gripping at the goal position varies, so in these cases, a plurality of goal positions are set. In this embodiment, description will be provided for a case where one goal position is set.

The start/goal position decision means 5 compares the input start and goal positions with information stored in the information storage means 8 to determine whether or not the input start and goal positions do not interfere with an obstacle, and when the start and goal positions do not interfere with the obstacle, the input start and goal positions are decided as the start and goal positions (S205). The verification of the presence/absence of interference will be described below in detail. When the input start and goal positions interfere with an obstacle, the goal position which interferes with the obstacle is deleted or the like, if necessary, the operator is requested to again input the goal position, and the same determination is made for the newly input start/goal position. This procedure is repeatedly performed until the start/goal position is determined.

Figure 5:
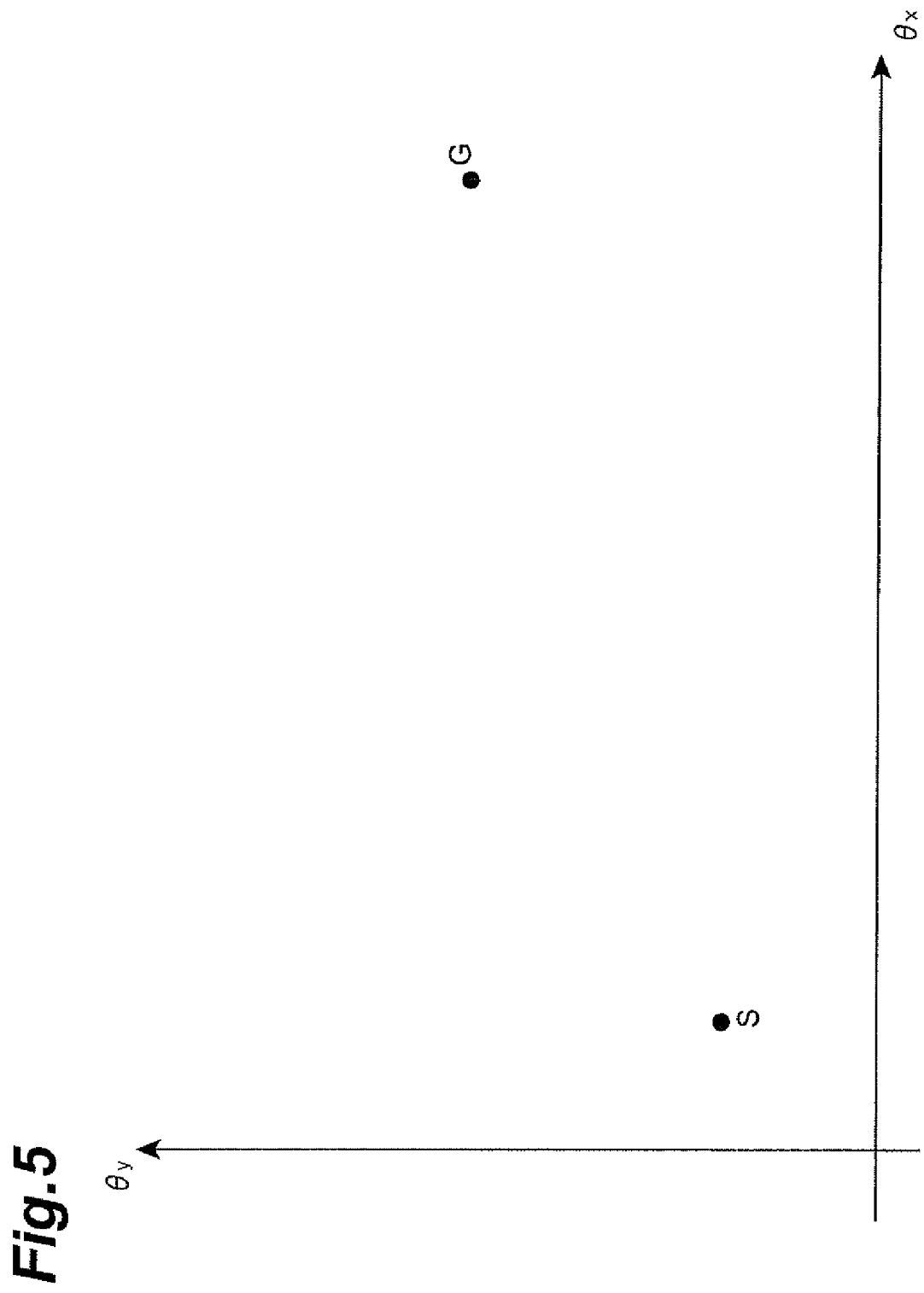
FIG. 5 is a diagram showing a multidimensional coordinate space during the candidate route creation process.

The decided start and goal positions on the work space are converted into the start and goal positions in the multidimensional coordinate space. For convenience of explanation, description will be made assuming that the multidimensional coordinate space is a two-dimensional coordinate space $\theta_x$-$\theta_y$. This corresponds to a case where robot arm has two articular joints 102. Here, the start position S and the goal position G are set in the two-dimensional coordinate space $\theta_x$-$\theta_y$ (see FIG. 5). The start and goal positions may be input in advance as the coordinates in the multidimensional coordinate space.

Figure 6:
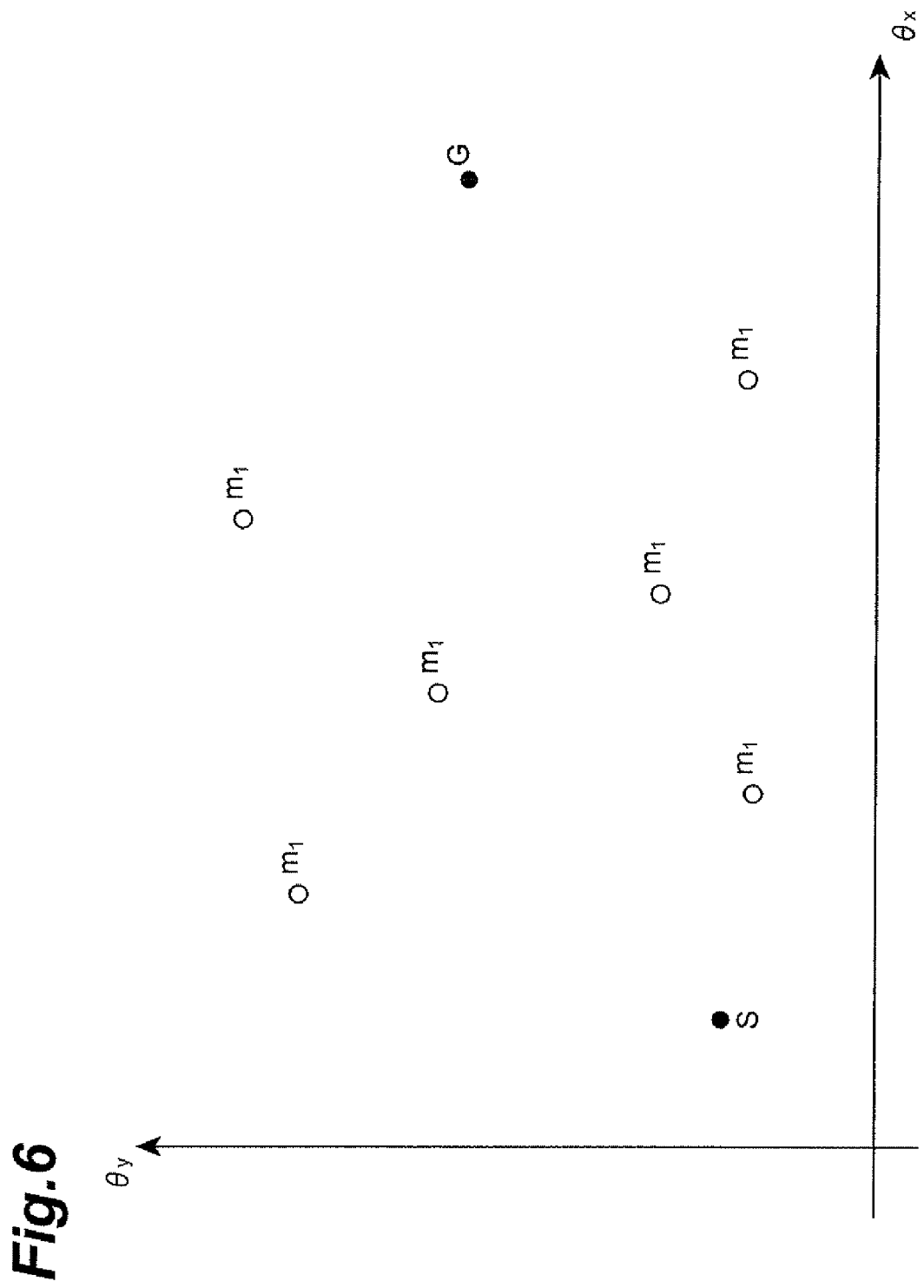
FIG. 6 is a diagram showing a multidimensional coordinate space during the candidate route creation process.

Next, the procedure of the candidate route creation process (S210) when a first candidate route is created will be described with reference to FIG. 4. The candidate route creation process is executed by the candidate route creation means 6. A random number is first generated in accordance with the probability distribution set in advance in the multidimensional coordinate space so as to temporarily set a plurality of intermediate points (set a plurality of candidate intermediate points $m_1$) between the start and goal positions on the multidimensional coordinate space (see FIG. 6, S305). After a plurality of candidate intermediate points $m_1$ are set, one, which can be suitably used to create a candidate route, of the candidate intermediate points $m_1$ is set as an intermediate point $M_1$ (see FIG. 7, S310).

Figure 7:
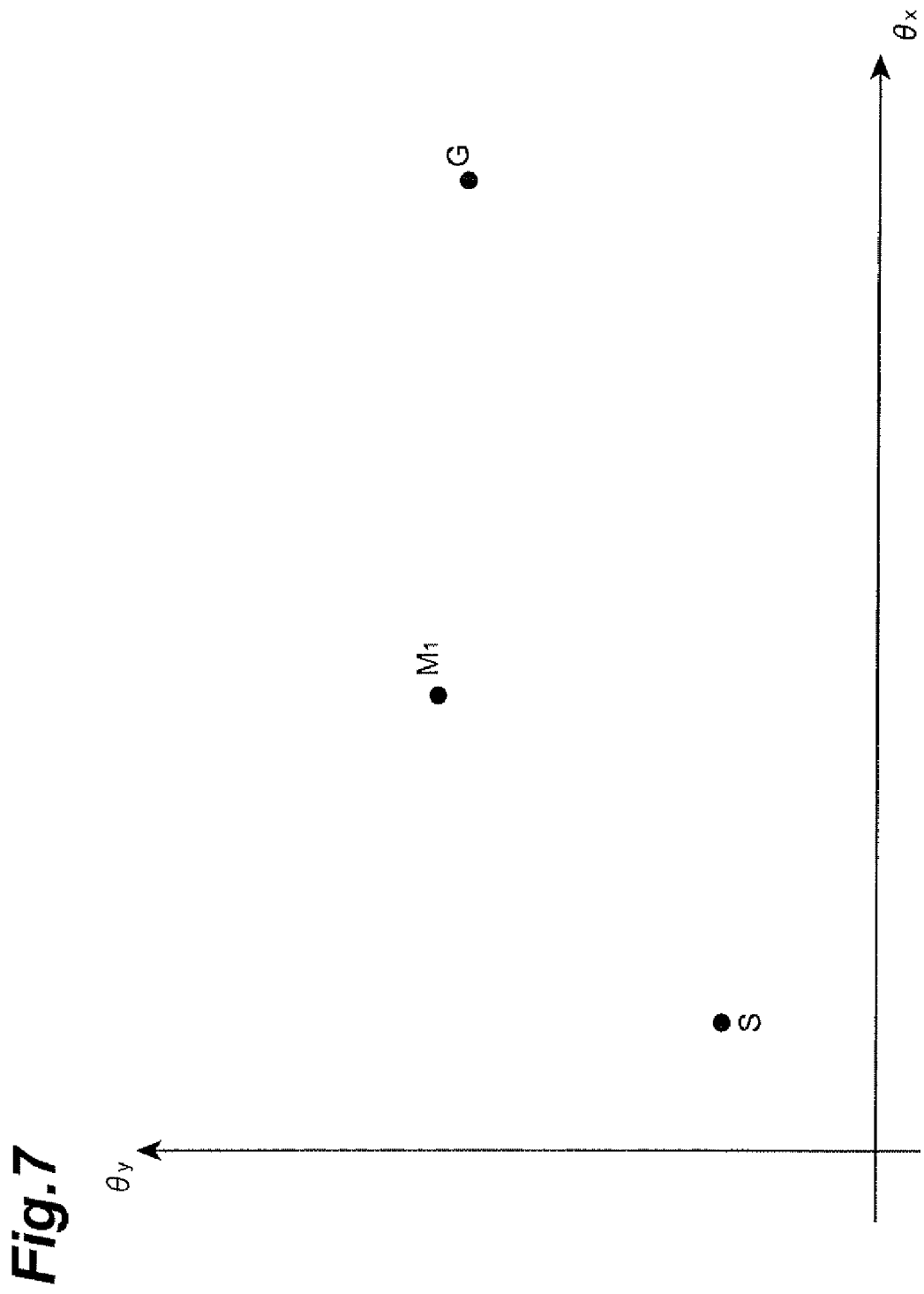
FIG. 7 is a diagram showing a multidimensional coordinate space during the candidate route creation process.

As described above, although a suitable one of a plurality of candidate intermediate points $m_1$ is set as the intermediate point $M_1$, the degree of manipulability is calculated for all the candidate intermediate points $m_1$, a candidate intermediate point $m_1$ with the highest degree of manipulability, that is, with the best manipulability is used as the intermediate point $M_1$ (see FIG. 7). The manipulability is described in "Computer-Controlled Machine System Series 10, Foundations of Robot Control" (Chapter 4) written by Tsuneo Yoshikawa published by Corona Publishing Company. The manipulability indicates how freely an automated device (here, the finger portion of the robot arm 100) can be manipulated, and the degree of manipulability represents the manipulation ability. The manipulability includes kinematic manipulability and dynamic manipulability. Here, the degree of manipulability may be based on either kinematic manipulability or dynamic manipulability.

Figure 8:
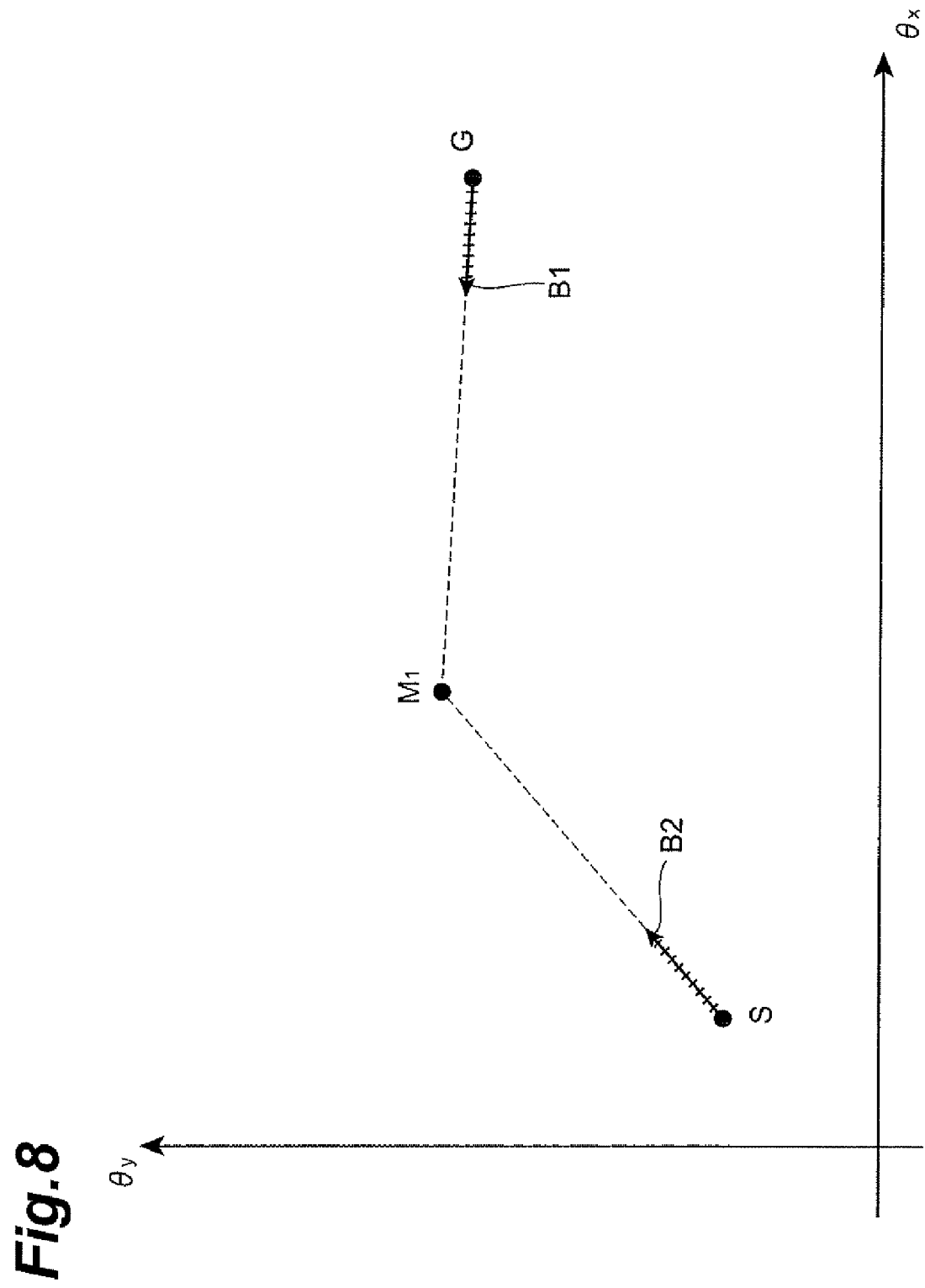
FIG. 8 is a diagram showing a multidimensional coordinate space during the candidate route creation process.

In this way, the start position S, the intermediate point $M_1$, and the goal position G are decided/selected, and the start position S—the intermediate point $M_1$ and the intermediate point $M_1$—the goal position G are connected to each other in the two-dimensional coordinate space $\theta_x$-$\theta_y$ at the shortest distance (the distance on the two-dimensional coordinate space $\theta_x$-$\theta_y$ regarding the articular joint 102). With regard to the distances on the work space and the multidimensional coordinate space, any distance function may be used insofar as it can define the distance. For example, the Euclidean distance function or the like may be used. Then, a line segment on the goal position G side, that is, a predetermined length from the goal position G with respect to a vector B1 is cut on the two-dimensional coordinate space $\theta_x$-$\theta_y$ (see FIG. 8), and collision determination is performed for the predetermined length (S325). The collision determination is performed to determine whether or not a candidate route to be created does not interfere with an obstacle on the work space.

Specifically, the vector B1 is divided into minute sections (see FIG. 8), and the collision determination is performed for each boundary between the minute sections. The determination for the minute sections is sequentially performed from the goal position G side toward the intermediate point $M_1$ side. The position coordinate on the two-dimensional coordinate space $\theta_x$-$\theta_y$ of the boundary between the minute sections is converted to the actual work space and compared with the information regarding the obstacle stored in the information storage means 8, so the determination of the presence/absence of interference on the work space is performed. If there is no interference, a candidate route is created to the end portion of the vector B1 for the predetermined length (S330). After the collision determination regarding the vector B1 on the goal position G side has been completed, similarly, the collision determination on the start position S side is performed (S335, S340, and S345). If there is no interference on the start position S side, a route is created to the end portion of a vector B2 for the predetermined length (S350). After the vector B1 has been created, the vector B1 and the start position S are connected to each other, and collision determination may be performed for the predetermined length from the start position S toward the vector B1.

With regard to the vectors B1 and B2 for the predetermined length on the goal position G side and the start position S side, if there is no collision, the collision determination is performed for an additional predetermined length with the intermediate point $M_1$ remains as it is, or with the vector B1 as it is when the vector B1 and the start position S are connected to each other (S355—no). Meanwhile, if a route is created while the collision determination is performed, it may be determined that the route being created interferes with the obstacle on the work space. When it is determined during the collision determination that there is a collision along the predetermined length, the intermediate point $M_i$ is discarded for the predetermined length, and a new intermediate point $M_i$ is set, Thereafter, the same candidate route creation is continued by using the new intermediate point $M_i$ (S325, S345—no).

Figure 9:
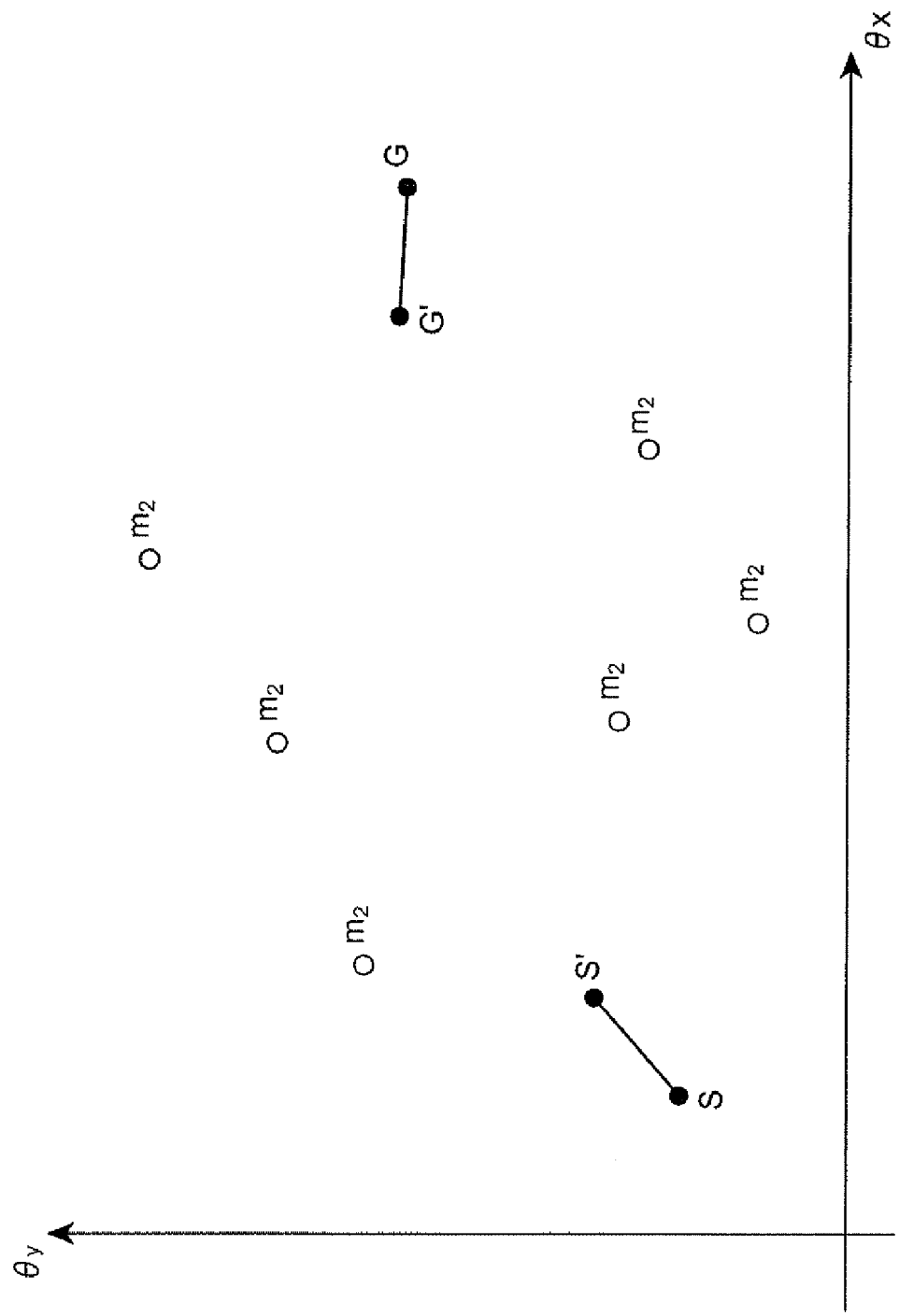
FIG. 9 is a diagram showing a multidimensional coordinate space during the candidate route creation process.
Figure 10:
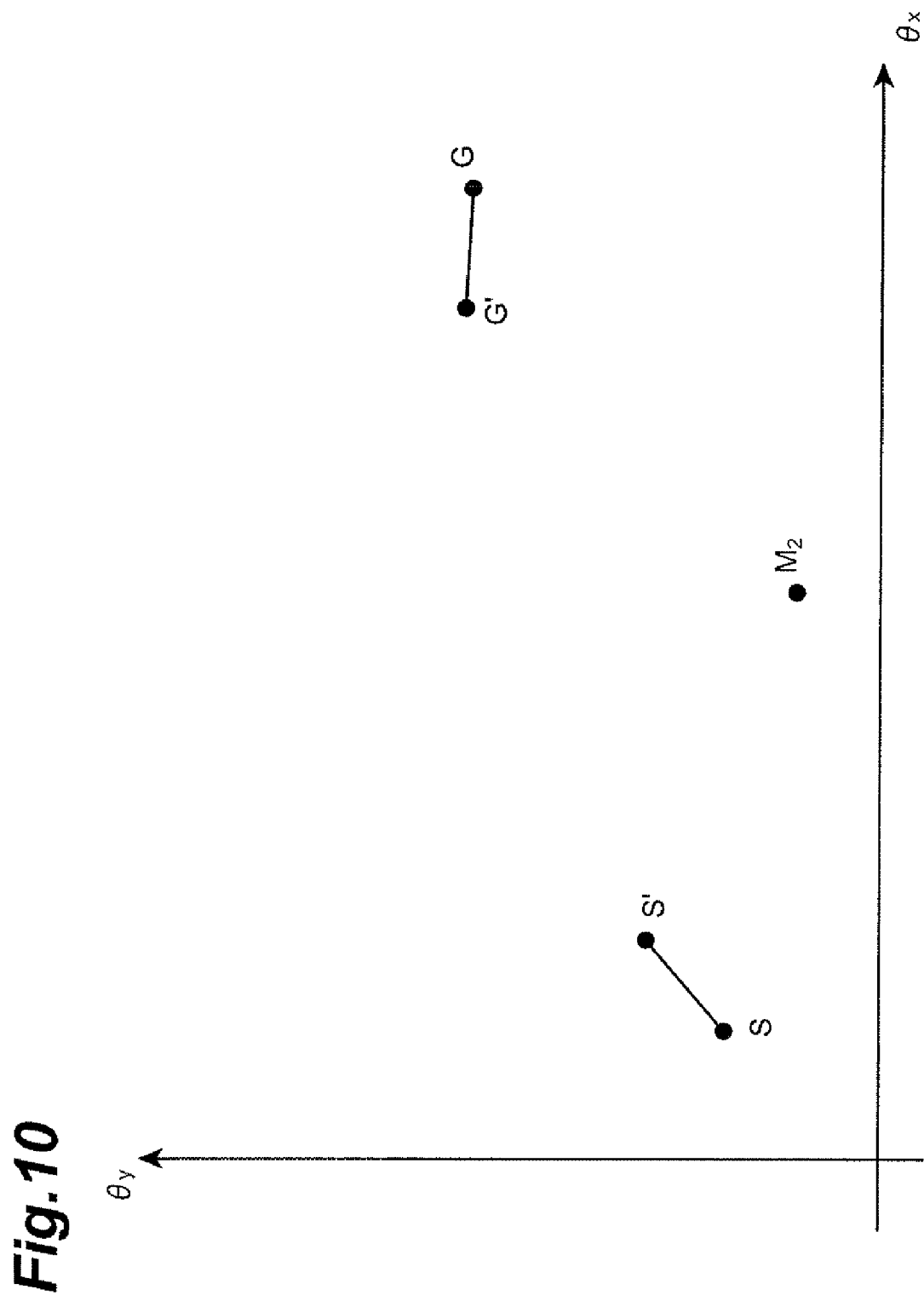
FIG. 10 is a diagram showing a multidimensional coordinate space during the candidate route creation process.

Hereinafter, an example where the new intermediate point $M_2$ needs to be set by the collision determination during the candidate route creation for a second predetermined length by the intermediate point $M_1$ will be described. When the new intermediate point $M_2$ is set, a plurality of candidate intermediate points $m_2$ are randomly set on the two-dimensional coordinate space $\theta_x$-$\theta_y$ (see FIG. 9, S305). Then, like the candidate intermediate point $m_1$, the degree of manipulability is calculated for all the candidate intermediate points $m_2$, and a candidate intermediate point $m_2$ with the highest degree of manipulability, that is, with the best manipulability is used as the intermediate point $M_2$ (see FIG. 10, S310).

Figure 11:
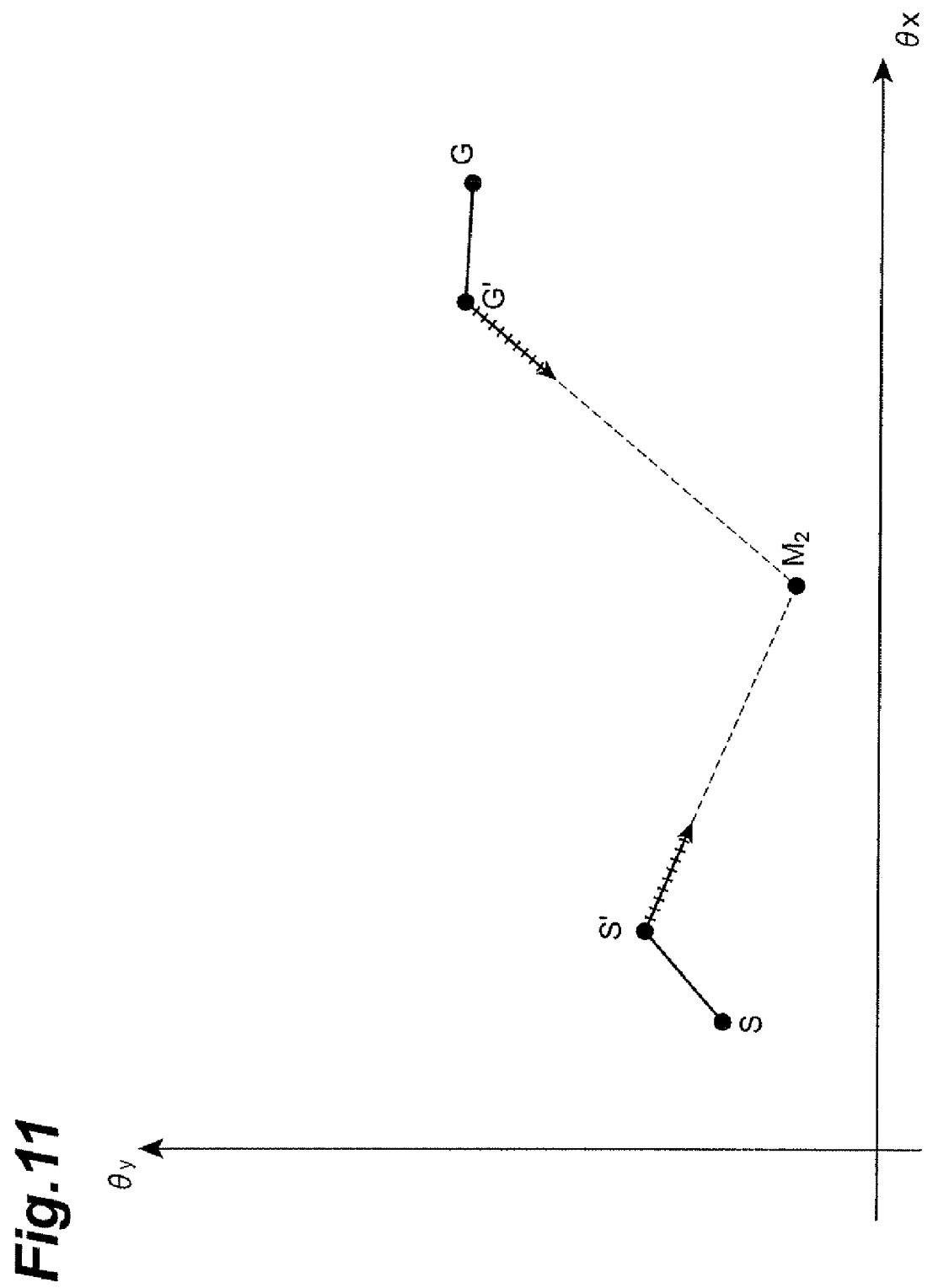
FIG. 11 is a diagram showing a multidimensional coordinate space during the candidate route creation process.
Figure 12:
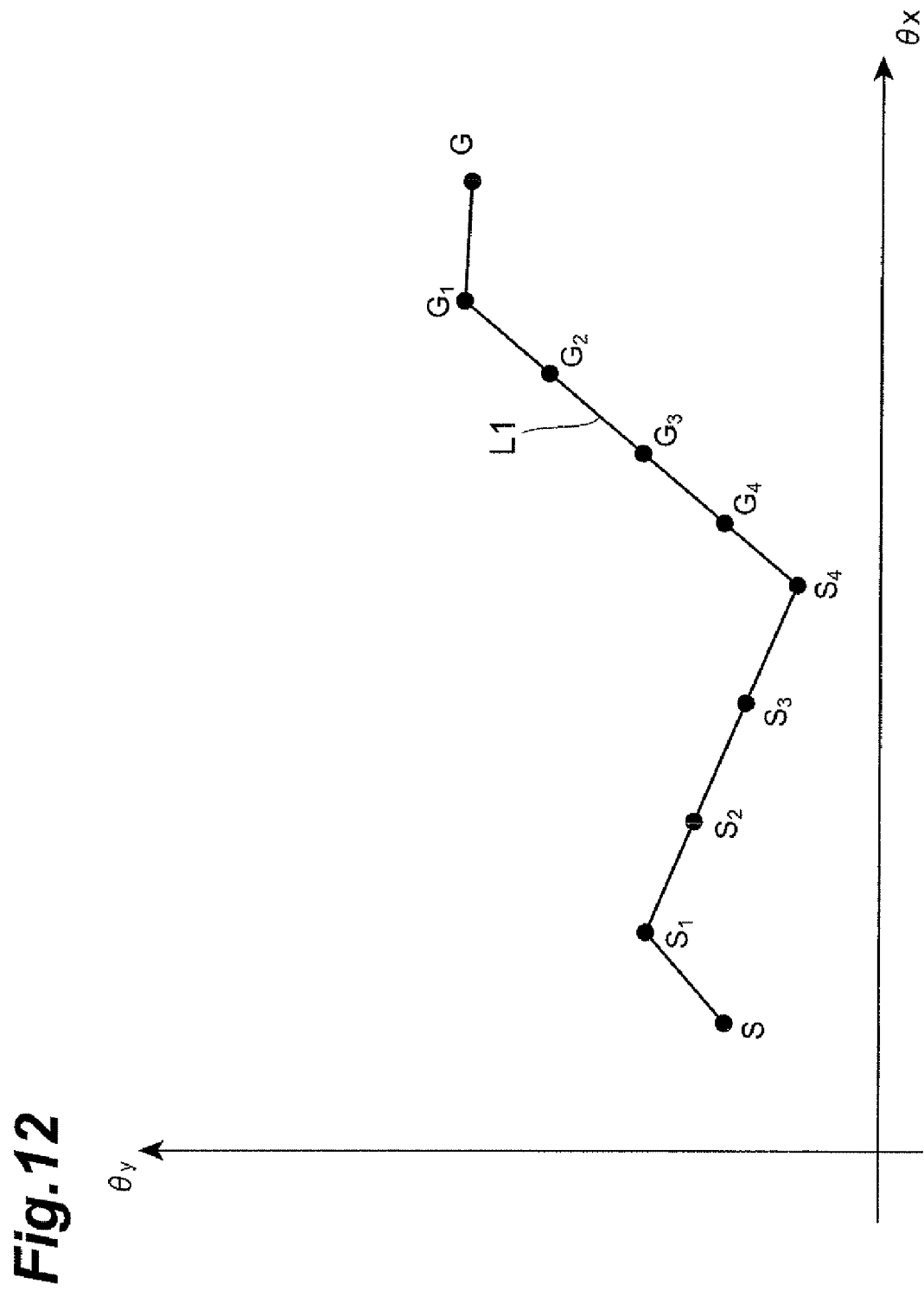
FIG. 12 is a diagram showing a multidimensional coordinate space during the candidate route creation process.

After the candidate intermediate point $m_2$ with the best manipulability from a plurality of candidate intermediate points $m_2$ is used as the intermediate point $M_2$, one, which is at a distance closest to the intermediate point $M_2$ in the work space, of the goal position G and a point G' on the candidate route created from the goal position G is selected for the use in the route creation (see FIG. 11, S315 and S320). Here, although there are two points (G and G') on the candidate route, in the subsequent candidate route creation process, one of a plurality of points may be selected.

With regard to the start side when the route planning is performed by using the intermediate point $M_2$, candidate route creation is performed by using one, which is at a distance closest to the intermediate point $M_2$, of the start position S and a point S' set in advance from the start position S (see FIG. 11, S340). Thereafter, the same procedure as above is repeatedly performed, and finally, if the route on the start position S side and the candidate route on the goal position G side are joined together, the first candidate route L1 is decided (S355—yes). When one candidate route has been created, the candidate route creation process (S210) ends. For subsequent explanation, the intermediate points created from the start of the candidate route L1 are referred to as intermediate points $S_1$, $S_2$, $S_3$, and $S_4$, and the intermediate point created from the goal are referred to as intermediate points $G_1$, $G_2$, $G_3$, and $G_4$.

Returning to FIG. 3, if the first candidate route L1 as a candidate has been created, the counter i is incremented by one (S215) and compared with the input set value n. When the counter i is less than the set value n (S220—yes), the process returns to the candidate route creation process (S210), and a candidate route is created again.

Figure 13:
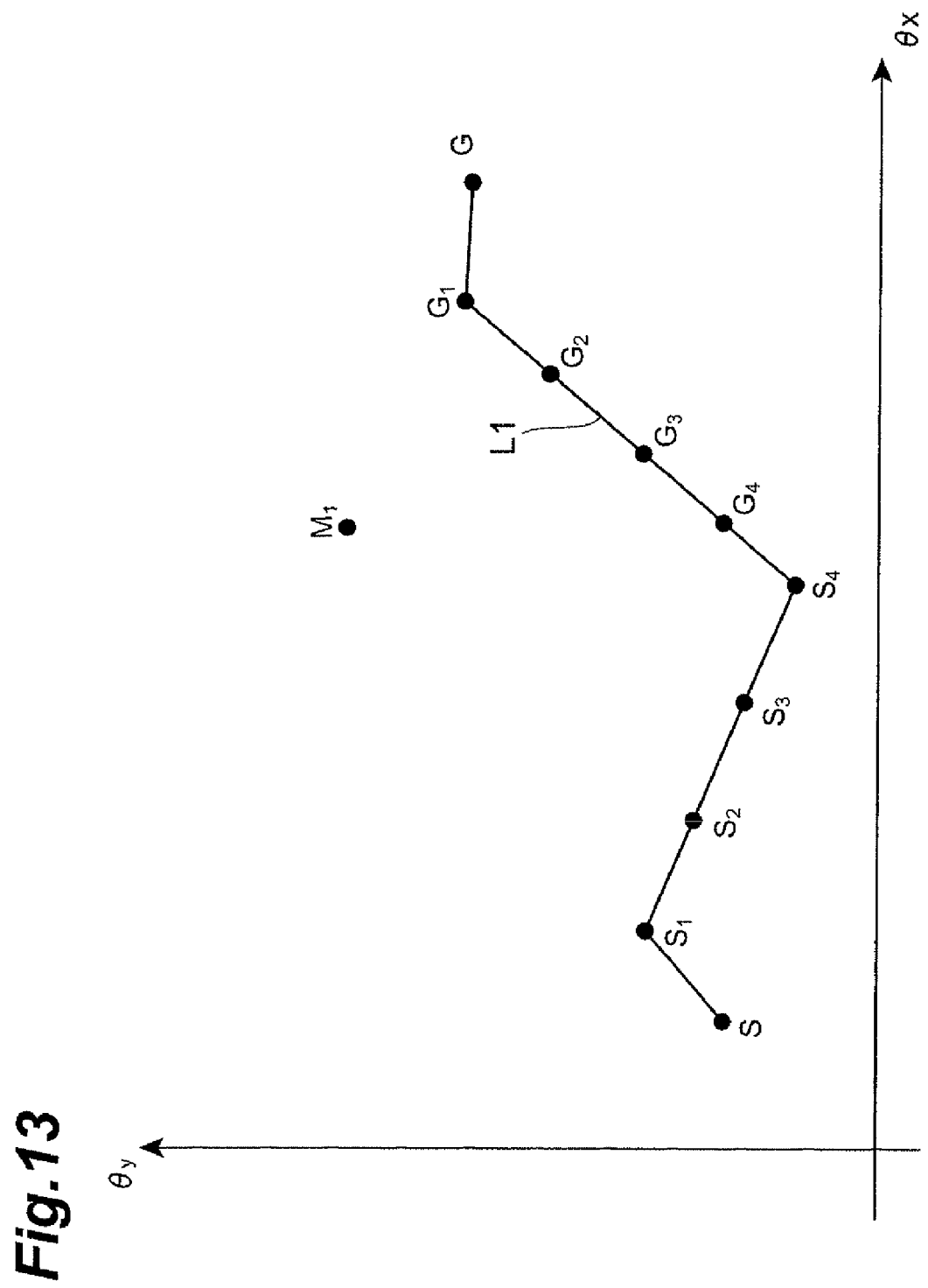
FIG. 13 is a diagram showing a multidimensional coordinate space during the candidate route creation process.
Figure 14:
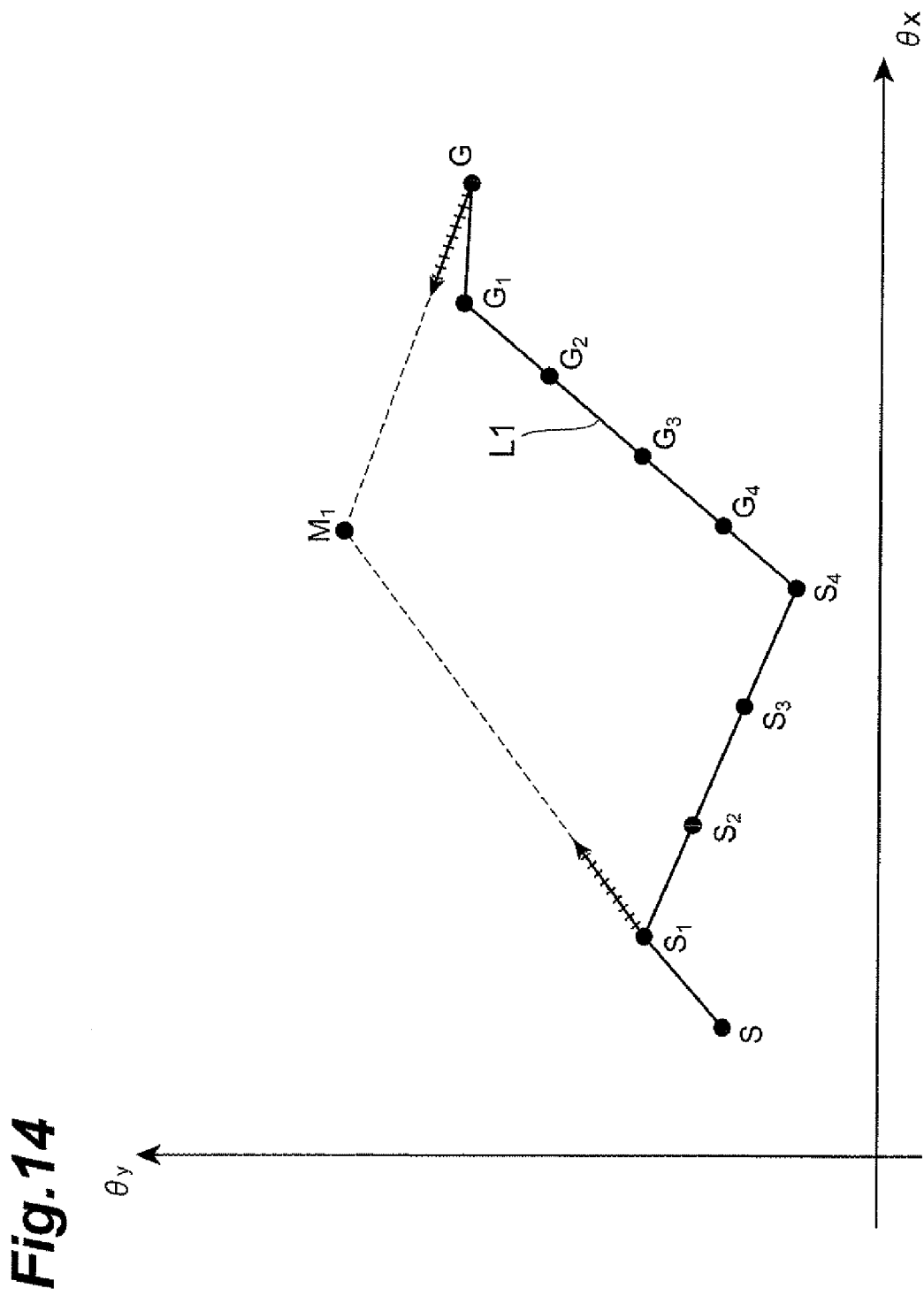
FIG. 14 is a diagram showing a multidimensional coordinate space during the candidate route creation process.

Next, creation of a second travel route will be described with reference to FIG. 4. First, like the creation of the first candidate route L1, a plurality of candidate intermediate points are set on the two-dimensional coordinate space $\theta_x$-$\theta_y$ (S305), and the degree of manipulability is calculated to set an optimum intermediate point $M_1$ (see FIG. 13, S310). Then, one, which is at a distance closest to the intermediate point $M_1$ in the work space, of the goal position G and the intermediate points $G_1$, $G_2$, $G_3$, and $G_4$ of the previously created candidate route L1 is selected for the use in the route creation (S315 and S320). Here, the goal position G is selected (see FIG. 14).

With regard to the start side, candidate route creation is performed from one, which is at a distance closest to the intermediate point $M_1$, of the start position S and the intermediate points $S_1$, $S_2$, $S_3$, and $S_4$ (S340). Here, the intermediate point $S_1$ is selected (see FIG. 14). At this time, a partial route between the start position S and the intermediate point $S_1$ of the first candidate route L1 is used.

Figure 15:
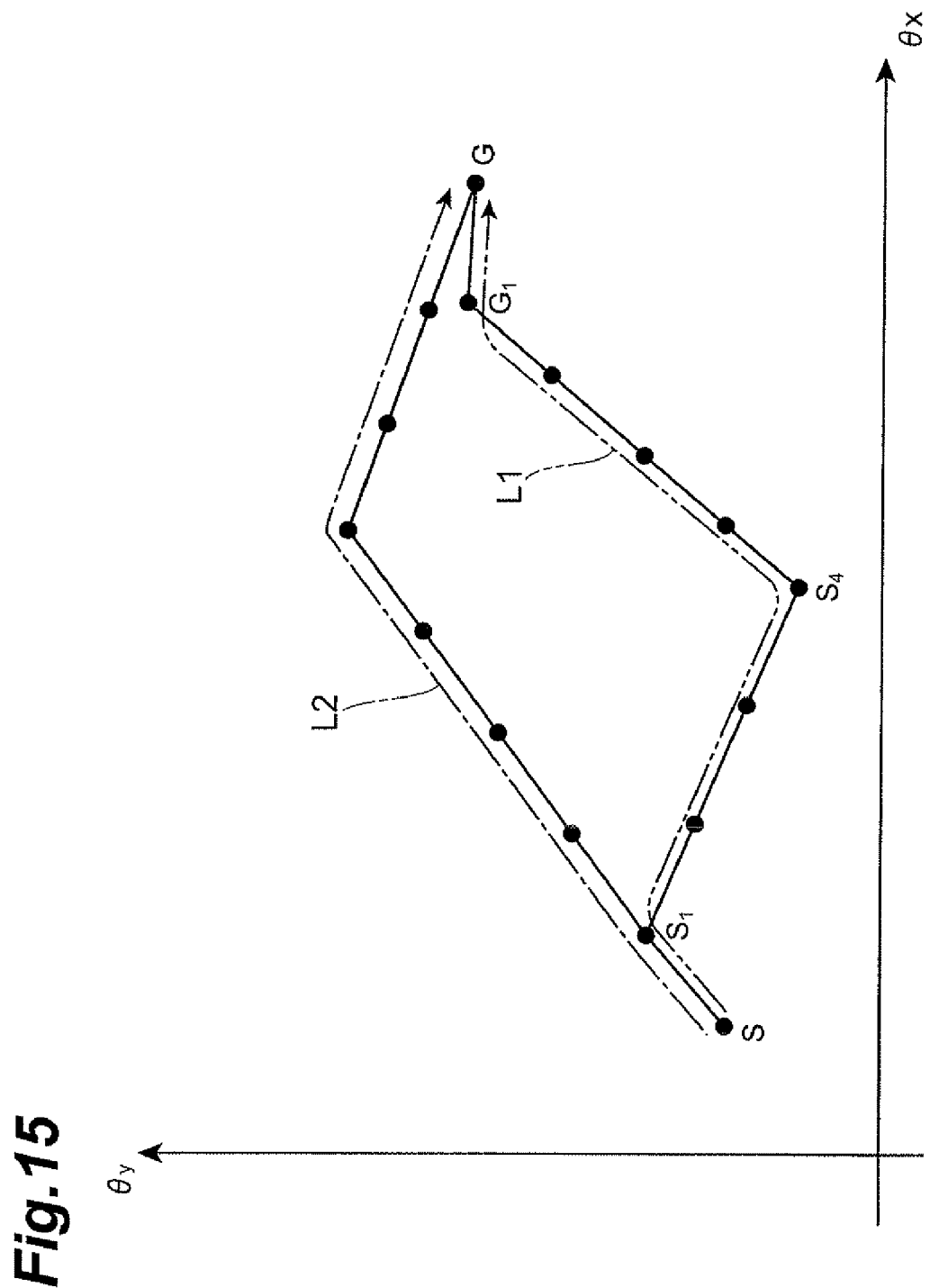
FIG. 15 is a diagram showing a multidimensional coordinate space during the candidate route creation process.

Thereafter, similarly, the collision determination and the candidate route decision for a predetermined length are repeatedly performed on the goal side and the start side (S325, S330, S345, and S350), and finally, if the route on the start position S side and the candidate route on the goal position G side are joined together, the second candidate route L2 is decided (see FIG. 15, S355—yes).

Figure 16:
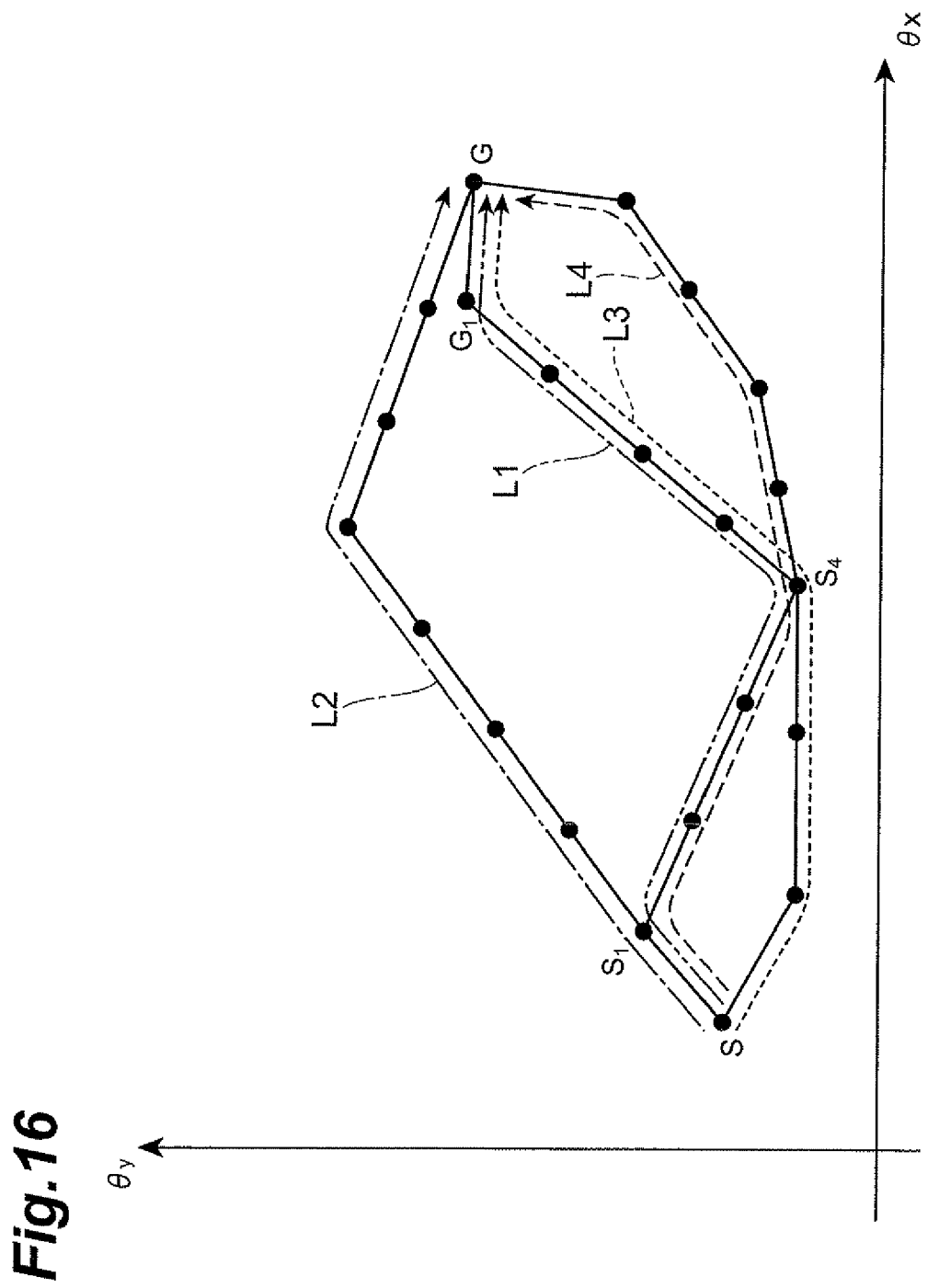
FIG. 16 is a diagram showing a multidimensional coordinate space during the candidate route creation process.

The candidate route creation process is repeatedly performed until the counter i reaches the set value n (=4), so candidate routes L3 and L4 are created on the two-dimensional coordinate space $\theta_x$-$\theta_y$ (see FIG. 16).

Returning to FIG. 3, after a set number of candidate routes have been created (S220—no), the travel quantity is calculated with respect to each of the candidate routes L1, L2, L3, and L4 (S225). The travel quantity of the wrist position X of the robot arm 100 is converted into the travel quantity in the work space when having traveled along each candidate route, and evaluation is performed on the converted travel quantity. For example, the travel quantity when the candidate route L1 is used becomes the sum of the travel distance of the wrist position X in the work space when the posture is changed from the start position S to the intermediate point $S_1$, the travel distance of the wrist position X in the work space when the posture is changed from the intermediate point $S_1$ to the intermediate point $S_4$, the travel distance of the wrist position X in the work space when the posture is changed from the intermediate point $S_4$ to the intermediate point $G_1$, and the travel distance of the wrist position X in the work space when the posture is changed from the intermediate point $G_1$ to the goal position G.

After the travel quantity has been calculated for all the candidate routes, the travel quantities are evaluated and compared with each other (S230), and a candidate route which can have the smallest travel quantity and achieve efficient travel is decided as a travel route that should be used (S235). S225 to S235 are executed by the travel quantity evaluation means 7. The route output means 4 converts the selected travel route into a signal for an actuator and outputs the converted signal to the actuator of each articular joint 102 of the robot arm 100. Thus, the joints of the robot arm 100 are operated along the relevant travel route to move the wrist position X.

As described above, according to the route creation method of this embodiment, a plurality of candidate routes can be created by using the generated intermediate point, and thereafter the travel quantity of the wrist position X of the robot arm 100 can be evaluated with respect to each candidate route to select a candidate route, which achieves the most efficient travel of the wrist position X of the robot arm 100, as a travel route. Therefore, a travel route can be created which reduces the travel quantity of the wrist position X of the robot arm 100 and achieves the efficient travel of the wrist position X of the robot arm 100.

According to the route creation method of this embodiment, a candidate route can be newly created by using the partial route of the previously created candidate route. Therefore, a plurality of candidate routes can be efficiently created.

According to the route creation method of this embodiment, the travel quantity of the robot arm 100 when having traveled along the created candidate route can be converted into the travel quantity of the wrist position X of the robot arm 100 in the work space, and the converted travel quantity can be evaluated. Therefore, a travel route can be created which achieves the most efficient travel of the robot arm 100 in the actual space.

The invention is not limited to the above-described embodiment.

For example, when a plurality of goal positions are set and one goal position selected (S320), a goal position which is at a distance closest to the intermediate point from the goal positions may be selected.

The articular joint 102 of the robot arm 100 may be rotated or may be moved straight.

Industrial Applicability

The invention can create a travel route which reduces the travel quantity of the robot and achieves the efficient travel of the robot.

The invention claimed is:

1. A route creation method of creating a travel route of a traveling part to be moved by an operation of joints in a robot having a plurality of joints, the route creation method comprising at least one processor for the steps of:

generating an intermediate point probabilistically between an initial position and a final position of the travel route and creating a plurality of candidate routes as candidates of the travel route between the initial position and the final position via the intermediate point; and evaluating a travel quantity of the traveling part of the robot with respect to each candidate route to select one travel route, wherein, when a new candidate route is created, a new intermediate point is set, a point which is at a distance closest to a newly created candidate intermediate point is selected from the final position or the intermediate point in the previously created candidate route, and when the intermediate point in a previously created candidate route is selected, a partial route between the selected intermediate point and the final position is used as a part of the new candidate route, and a point which is at a distance closest to the newly created candidate intermediate point is selected from the initial position or the intermediate point in the previously created candidate route, and when the intermediate point in the previously created candidate route is selected, a partial route between the selected intermediate point and the initial position is used as a part of the new candidate route.

2. The route creation method according to claim 1, wherein, when the travel quantity of the traveling part of the robot is evaluated with respect to each candidate route, a work space where the robot is actually present is defined, the travel quantity of the traveling part when having traveled along the candidate routes is converted into a travel quantity in the work space, and the converted travel quantity is evaluated.

3. A route creation device comprising at least one processor for creating a travel route of a traveling part to be moved by an operation of joints in a robot having a plurality of joints, the route creation device comprising:

a candidate route creation unit generating an intermediate point probabilistically between an initial position and a final position of the travel route and creating a plurality of candidate routes as candidates of the travel route between the initial position and the final position via the intermediate point; and a travel quantity evaluation unit evaluating the travel quantity of the traveling part of the robot with respect to each candidate route to select one travel route, wherein, when the candidate route creation unit creates a new candidate route, a new intermediate point is set, a point which is at a distance closest to a newly created candidate intermediate point is selected from the final position or the intermediate point in the previously created candidate route, and when the intermediate point in a previously created candidate route is selected, a partial route between the selected intermediate point and the final position is used as a part of the new candidate route, and a point which is at a distance closest to the newly created candidate intermediate point is selected from the initial position or the intermediate point in the previously created candidate route, and when the intermediate point in the previously created candidate route is selected, a partial route between the selected intermediate point and the initial position is used as a part of the new candidate route.

4. The route creation device according to claim 3, wherein the travel quantity evaluation unit defines a work space where the robot is actually present, converts the travel quantity of the traveling part when having traveled along each candidate route into a travel quantity in the work space, and evaluates the converted travel quantity.

* * * * *